United States Patent [19]

Tiedeman et al.

[11] 3,872,051

[45] Mar. 18, 1975

[54] ADHESIVES CONTAINING METAL POWDERS

[75] Inventors: George T. Tiedeman; Maurice F. Gillern, both of Seattle, Wash.

[73] Assignee: Weyerhaeuser Company, Tacoma, Wash.

[22] Filed: May 25, 1972

[21] Appl. No.: 256,708

[52] U.S. Cl.................. 260/38, 156/331, 156/335, 260/29.3, 260/29.4 R, 260/37 M, 260/39 M
[51] Int. Cl............................................. C08g 51/04
[58] Field of Search.. 260/37 M, 38 R, 39 P, 37 EP, 260/39 M, 57 C, 64, 38

[56] References Cited
UNITED STATES PATENTS

| | | | |
|---|---|---|---|
| 1,614,172 | 1/1927 | Amann | 260/51 |
| 2,526,427 | 10/1950 | Simon | 260/38 |
| 3,471,443 | 10/1969 | Bornstein | 260/38 |
| 3,503,919 | 3/1970 | Cadus | 260/39 M |
| 3,586,735 | 6/1971 | Giller | 260/51 R |
| 3,629,184 | 12/1971 | Kawam | 260/38 |
| 3,658,751 | 4/1972 | Grazen | 260/39 M |
| 3,691,130 | 9/1972 | Logvinenko | 260/37 M |

*Primary Examiner*—Joseph L. Schofer
*Assistant Examiner*—Paul R. Michl
*Attorney, Agent, or Firm*—Christensen, O'Conner, Garrison & Havelka

[57] ABSTRACT

Disclosed are liquid, curable adhesives having a pH of less than 3.5 and comprising an aldehyde condensation polymer and a finely divided metal selected from aluminum and iron. Such adhesives are particularly useful for application to cellulosic substrates such as wood. When the cured adhesive is subjected to hydrolytic conditions, the finely divided metal reacts with hydrogen ions leached from the adhesive and thereby prevents or markedly reduces degradation of the cellulosic substrate.

24 Claims, No Drawings

ADHESIVES CONTAINING METAL POWDERS

BACKGROUND OF THE INVENTION

This invention relates to liquid, curable adhesive compositions, to processes of making and using such adhesives and to hardener compositions useful therein.

It is well known that many common wood adhesives, such as urea-formaldehyde resins and some phenol-formaldehyde resins, cure most rapidly and provide superior bonds when cured at a low pH, i.e., less than 3.5. It is also known, however, that the use of adhesives having such a low pH to bond wood members can result in gradual degradation of wood along the glue line when the cured adhesive is exposed to hydrolytic conditions, e.g., if the wood has a high moisture content at the time the adhesive is applied or if the bonded structure is subsequently exposed to a moist environment for a prolonged period. Such degradation, which can be particularly acute when the adhesive is cured at a pH of less than 2.5, apparently results from gradual leaching of acid from the cured adhesive and consequent hydrolysis of the wood. When bonded structures are sheared along the glue line, such degradation usually is evidenced by very low shear strengths coupled with shallow wood failure over a large percentage of the area adjacent the glue line.

Experience indicates that a glue line pH of 3.5 is a common "safe" minimum for long-term wood stability. (ASTM D2559-66T-6.1 specifies that wood adhesives shall have a pH of no less than 2.5, while Military Specifications for Wood Adhesives, Mil.-A-397B-3.7, specifies a minimum pH of 3.5.) However, where bonded wood structures are likely to be subject to conditions of high temperature and high humidity, even higher pH's may be necessary to prevent degradation completely.

SUMMARY OF THE INVENTION

According to this invention, it has been found that by incorporating a minor amount of finely divided aluminum or iron into acidic adhesive compositions of the type described above, degradation of cellulosic substrates bonded therewith is prevented or markedly reduced. The metal, which survives curing of the adhesive, apparently functions as a "latent" acid scavenger to react with and consume the hydrogen ions liberated when the cured adhesive is subjected to hydrolytic conditions, i.e., is exposed to moisture.

Thus, one aspect of this invention is directed to an improvement in liquid, curable adhesive compositions having a pH of less than 3.5 and comprising an aldehyde condensation polymer, the improvement being the inclusion in the composition of a minor amount of finely divided aluminum or iron.

This invention is also directed to compositions comprising an alkylene donating compound, such as formaldehyde or a formaldehyde-forming compound, and finely divided aluminum or iron. These compositions are useful as hardeners which can be combined with aldehyde condensation polymer resins to produce the adhesive systems of this invention.

This invention is further directed to an improvement in a process wherein a liquid, curable adhesive comprising an aldehyde condensation polymer and having a pH of less than 3.5 is cured in contact with a cellulosic material such as wood, the improvement being the incorporation into the liquid adhesive of finely divided aluminum or iron.

It is preferred that the amount of metal employed in the adhesives of this invention be such that when they are subjected to hydrolytic conditions after curing, the adhesives will exhibit a pH of at least 3.5, and most preferably above 4.0.

DETAILED DESCRIPTION OF THE INVENTION

The aldehyde condensation polymers used in the methods and compositions of this invention include phenoplasts such as condensation polymers of an aldehyde such as formaldehyde with a phenolic-type material such as phenol, phenol-resorcinol, xylenol, cresol, and resorcinol; aminoplasts such as condensation polymers of an aldehyde such as formaldehyde with compounds such as urea, melamine, melamine-urea, benzoguanamine and dicyandiamide; and ketone-aldehyde condensation polymers such as acetone-formaldehyde polymers, methyl ethyl ketone-formaldehyde polymers and methyl isobutyl ketone-formaldehyde polymers and such polymers further reacted with a phenol, e.g., phenol and resorcinol. The term "polymers," as used herein, refers to resinous mixtures that ordinarily do not crystallize or have sharp melting points. "Condensation" is used herein to mean a polymerization reaction in which a molecule, such as water, is eliminated and is to be distinguished from "addition" in which no by-product is formed. "Liquid, curable adhesives" refers to adhesives of both the cold-setting and heat-curable types. The expression "adhesives having a pH of less than 3.5" refers to adhesives which have such a pH throughout the curing process and also to adhesives which decrease in pH from above 3.5 to below 3.5 as curing progresses.

Finely divided aluminum and iron are particularly useful in the rapid-curing adhesives disclosed in the United States application of H. G. Freeman, M. F. Gillern and H. A. Smith entitled "Rapid Curing, Hydrophilic Resin Compositions," Ser. No. 256,709, filed May 25, 1972 (which application is incorporated herein by reference). The adhesives disclosed in the Freeman, et al., application comprise the reaction product of an aldehyde condensation polymer selected from phenoplasts and ketone-aldehyde condensation polymers with an amine salt selected from the hydrochloric, nitric and sulfuric acid salts of m-hydroxy aniline, 2,6-diaminopyridine and 4,4'-diaminodiphenylmethane. These adhesives cure most rapidly and give superior bonds at a pH of less than 3.

Another class of resins which are desirably cured at a low pH are prepared by reacting an aldehyde and a ketone, typically under mildly alkaline conditions, and then further reacting the resulting prepolymer with a polyhydroxy aromatic compound. The aldehyde:ketone mole ratios in these products are generally from 1.5:1 to 6:1, preferably from 2.5:1 to 4.5:1 and most preferably from 3:1 to 4:1. It is preferred that these prepolymers contain a substantial excess of free aldehyde, e.g., 15% by weight. The amount of polyhydroxy aromatic compound reacted with the ketone-aldehyde prepolymer should be such that the resulting resin contains substantially no free aldehyde, i.e., less than 0.5% by weight. The molar ratio of polyhydroxy aromatic to aldehyde in the ketone-aldehyde resin is generally from 0.2:1 to 5:1, preferably from 0.3:1 to 2:1 and most preferably from 0.75:1 to 1.25:1. Exemplary of aldehydes useful in these resins are formaldehyde, paraformaldehyde, trioxane, aldol, acetaldehyde and glyoxal. Useful ketones include acetone, methyl ethyl ketone and methyl isobutyl ketone. The polyhydroxy aromatic compound can be, for example, resorcinol, phloroglucinol, quebracho or a polyhydric, polynuclear aromatic prepared by reacting monochlorophenols with alkali metal hydroxides as described in Canadian Pats. Nos. 771,746 and 828,791. Acetone-formaldehyde resins further reacted or modified with resorcinol are preferred. Resins of the type just described can be modified by further reaction with an amine salt as described in the aforementioned Freeman, et al., application.

The metal powder can be incorporated into the adhesives of this invention in a variety of ways. For example, the metal can be added directly to the remainder of the adhesive components or, where an adhesive is prepared by combining a resin with a hardening agent which has a pH of about 7 or above, the metal powder can be conveniently incorporated into the adhesive via the hardener. When the adhesive is prepared by acidifying a nearly neutral or basic resin as is common in the use of aminoplasts such as urea-formaldehyde resins, the metal can be incorporated into the adhesive via the resin. Generally, the metal should not be added to an acidic resin or hardener until it is ready to be used. Because of its low equivalent weight, good reactivity with acids and relative softness (important when bonded wood structures are to be sawed), aluminum is the preferred metal for use in the methods and compositions of this invention.

A well-recognized method for determining the pH of cured adhesives and bonded assemblies is Fed. Test Method Std. No. 175 — Method 4011 (1956), which is incorporated herein by reference. According to this method, an adhesive is cast on glass as a thin film and the film is cured, dried and ground to (−)40 mesh. Two grams of the powder are suspended in 10 ml. of distilled water and the pH of the resulting suspension is measured after 15 min. and again every 24 hours until the values are constant within 0.5 pH unit, the stable value being taken as the pH of the adhesive. When reference is made herein to the pH of or exhibited by a cured adhesive, the pH has been or is to be determined according to this method. The amount of metal powder necessary to produce an adhesive which, when cured will exhibit a given pH upon exposure to hydrolytic conditions, e.g., at least the "safe" value of 3.5 referred to previously, can be readily determined by the just-described method.

The amount of metal necessary to prevent degradation of wood members bonded with the adhesives of this invention (or to reduce such degradation to an acceptable level) can also be determined by experimentation by varying the amount of metal employed, subjecting the bonded structures to hydrolytic conditions and observing the effect of such variations on the shear strength and wood failure along the glue line. Low shear strength (e.g., 50 p.s.i.) coupled with high, shallow wood failure along the glue line (e.g., 100%) is generally indicative of wood degradation. Accelerated "aging" of test specimens can be effected by boiling. The amount of metal necessary to prevent wood degradation or reduce it to an acceptable level will depend upon various factors including the pH at which the adhesive is cured, the fineness, shape and uniformity of distribution of the metal particles, the equivalent weight of the metal and the temperature and humidity conditions to which the bonded structures are to be exposed. Generally, it will be desirable to use an amount of metal which will cause the adhesive to have a pH under hydrolytic conditions of at least 3.0 and preferably at least 3.5. It has been found that 1.7 equivalents of aluminum powder per equivalent of available acid in the adhesive is generally more than adequate to provide a cured adhesive having a pH of at least 3.5 under hydrolytic conditions.

The particle size of the metal should be small in order to minimize the amount needed to prevent wood degradation. Spheroidal particles of less than 40 mesh or flaked particles of comparable surface area are preferred. Upon storage of liquid resins and hardeners containing metal powders having very high surface areas (e.g., atomized aluminum powders of less than 100 mesh), problems can ensue due to reaction between the highly reactive metal powder and trace amounts of water present in the resin or hardener. The consequent evolution of hydrogen gas and foaming of the resin or hardener usually can be avoided by employing sizes and shapes of metal particles selected so that the metal-water reaction will proceed slowly enough to permit dissipation of the reaction by-products and heat.

Curing agents useful in the hardener compositions of this invention include alkylene donating compounds, di-isocyanates and poly-isocyanates and epoxides used either alone or in combinations. The hardener compositions can also include conventional additives such as thickeners and wetting agents. The preferred curing agents are aldehydes such as formaldehyde, formaldehyde-forming compounds such as polyoxymethylene, trioxane and paraformaldehyde; aliphatic or cyclic aldehydes having up to 8 carbon atoms such as acrolein, glyoxal, acetaldehyde, propionaldehyde, butyraldehyde and furfuraldehyde. Suitable di-isocyanate curing agents include toluene di-isocyanate, phenylene di-isocyanate, 1,6-di-isocyanoto-hexane, and the like, while suitable epoxy curing agents include diglycidyl ether of bisphenol A, epoxidized phenolic novolacs and epoxidized polyglycols. Phenolic resoles and other similar polymers having free alkylol groups are also efficient curing agents.

The adhesives of this invention should be prepared immediately prior to curing so that curing can be effected before reaction between the metal and hydrogen ions in the adhesive has proceeded to the point where the pH has increased to a value above that desired for curing.

The following examples are provided by way of illustration only and are not intended to be limiting of the invention. All parts and percentages are by weight unless otherwise indicated.

In the following examples the results of "Block Shear Tests" on adhesives of this invention are reported in terms of "shear strength" and "% wood failure." The following procedures were employed in these tests. A liquid adhesive was spread on the face of one of a pair of matched, longitudinally-grained Douglas fir strips (¾ in. × 2-½ in. × 12 in.). The two strips were then superimposed face-to-face and clamped together at a selected pressure and for a selected time at 72°F. The resulting laminate was sawed transversely to produce five specimens which were trimmed to dimensions of 1-½ in. × 2 in. × 2 in. Each of these specimens was then sawed across the grain to the glue line to remove one ¼ in. × ¾ in. × 2 in. strip from each lamina (the strips being removed from opposite ends of the specimen). The laminae in the resulting specimens were thus offset by ¼ in., the remaining glue line having an area of 3.0 sq. in. (1.5 in. × 2.0 in.). Two specimens were "dry" conditioned at about 70°F. and 50% relative humidity for 48 hours, and three were subjected to "wet" cyclic conditioning according to the following modification of AITC Test 110. The three "wet" specimens were placed in an autoclave filled with water (65° to 80°F.) so that the specimens were completely submerged. A vacuum (20 – 25 in. of mercury) was then applied and held for about 30 min. The vacuum was then released and air pressure of about 75 p.s.i. was immediately applied and held for about 120 min. The specimens were then placed in a forced-air drier at 150°F. and 8% – 10% relative humidity until they had returned to within 15% of original weight (about 20 to 22 hrs.). All conditioned specimens were sheared at 0.05 in./min. load rate (applied to one of the offset ends); the maximum (breaking) load (p.s.i.) for each specimen was determined and separately averaged for dry and wet specimens; and the "shear strengths" were then calculated (shear strength (p.s.i.) = max. load (lbs.)/ 3.0 in.²). The percent wood failure along the glue line was estimated for each specimen and averaged for dry and wet specimens.

The metal powders used in the following examples were "purified" grades and consisted of substantially spherical particles of less than 40 mesh.

EXAMPLE 1 a. A 4-liter reactor was charged with the following:
1,690.0 g. phenol (90.4%)
401.6 g. paraformaldehyde flakes (94%)
10.8 g. water
16.8 g. calcium acetate The temperature was adjusted to 25°C. Heating and agitation were then applied bringing the mixture to reflux (110°C.) uniformly over a 60 min. period. The reflux was maintained for 2 hrs., and the mixture was cooled slightly 100°C., whereupon there was added 1,880.8 g. m-hydroxy aniline hydrochloride (48.5%). From 68°C. the mixture was heated to reflux (105°C.), the reflux was maintained for 2.5 hrs. and the resulting resin was then cooled to 25°C. The resin was water-washable, had a pH of 2.3 and a Gardner viscosity of "WX" (meaning between "W" and "X") at 25°C. Varying the pH of this resin substantially can cause some precipitation to occur. Therefore, it should be used with a neutral or preferably acidic hardener. (It is anticipated that by combining this resin with a hardener of substantially the same pH, a good "primerless" adhesive will be produced; see the second note to Table 2 hereinafter.)

m-Hydroxy aniline hydrochloride (sometimes referred to hereinafter as "m-HA.HCl") utilized in the procedures of this and subsequent examples herein was prepared according to the following procedure unless otherwise indicated. To 31.7 parts water were added 32.0 parts hydrochloric acid (38%) and to the resulting solution was added 36.3 parts m-hydroxy aniline with stirring. Stirring was continued until all the m-hydroxy aniline was dissolved.

b. A 5-gallon reactor was charged with the following:
6,569.7 g. phenol (90.4%)
2,238.6 g. water
6,034.3 g. formaldehyde (50.2%)
500.2 g. methanol Temperature was adjusted to 35°C. whereupon there was added 383.9 g. sodium hydroxide (50.1%). The temperature of the reaction mixture was allowed to rise from 41°C. to 65°C. in 70 min. at a uniform rate; no external heating was required during the heat-up. The reaction mixture was maintained at 65°C. for 105 min. and was then adjusted to pH 8.4 with 124.0 g. formic acid (90.7%). The reaction mixture was maintained at 65° until 3 hrs. had elapsed from the start of pH adjustment. There was then added 6,952.2 g. formaldehyde (50.2%) and the reaction mixture was mixed thoroughly while cooling to 25°C. A 5-gallon reactor was charged with 6,008 g. of the resulting base resin. The temperature was raised from 25°C. to 60°C. whereupon 8,013 g. resorcinol was added. Heating was immediately reapplied bringing the temperature from 44°C. to 71°C. in 5 min. at which point a mild exotherm was noted. No external heating was applied from 71°C. to 104°C. where the exotherm subsided. Heating was again applied and the reaction mixture was brought to reflux (105°C.) and the reflux was maintained for 5 min. The mixture was cooled to 100°C., and 7,945 g. m-HA.HCl (48.5%) was added. From 76°C. the mixture was heated to reflux (105°C.), and the reflux was held for 2 hrs. The resin was then cooled to 45°C., and 714 g. of pyrogenic silica ("Cab-O-Sil M-5," available from Cabot Corporation) was added with mixing; the pyrogenic silica renders the composition thixotropic. The resulting mixture was water-washable and had a pH of 2.60.

c. The procedure of Example 1(b) was repeated with the following modifications. The amounts of base resin, resorcinol and m-HA.HCl (48.5%) employed were 271 g., 362 g. and 359 g., respectively. After the addition of the m-HA.HCl, the reaction mixture was stirred thoroughly at 75°C. and then there was added 8.5 g. of a hydroxyethyl cellulose having a 0.9 to 1.0 degree of substitution and a 1.6 to 2.0 molar substitution of ethylene oxide, and a 2% solution LVT Brookfield viscosity of 70 to 100 cps. at 25°C. in the L range ("Cellosize QP 40 high" — Union Carbide Corporation); no pyrogenic silica was added. The reaction mixture was heated from 75°C. to reflux with vigorous agitation to avoid lumping of hydroxyethyl cellulose. The reflux temperature (104°C.) was maintained for 2 hrs. and the resin was then cooled to 25°C. The hydrophilic resin had a pH of 2.60 and a Gardner viscosity of "MN" at 25°C.

d. Liquid hardener formulations containing varying amounts of aluminum powder were prepared by mixing together the ingredients shown in Table 1 in the order recited. One part of the hardeners was individually combined with two parts of the final resins of Examples 1(a), (b) and (c). Films of the resulting adhesives were cast, allowed to cure and then powdered; the stable pH values of aqueous slurries of the powders were determined as described previously and are recorded in Table 2. The results of Block Shear Tests on the adhesives are also shown in Table 2.

Table 1

| Ingredients | Hardeners (Weight Percent) | | |
| --- | --- | --- | --- |
|  | I | II | III |
| "U.F. 85"* | 60.0 | 60.0 | 56.0 |

Table 1-Continued

| Ingredients | Hardeners (Weight Percent) | | |
|---|---|---|---|
| | I | II | III |
| Water | 7.5 | 7.5 | 7.5 |
| "Dow Latex 612"** | 25.0 | 24.0 | 23.5 |
| Calcium Carbonate*** | 1.0 | 1.0 | 1.0 |
| Aluminum Powder | 3.5 | 5.0 | 10.0 |
| "Cab-O-Sil M-5" Pyrogenic Silica | 3.0 | 2.5 | 2.0 |

\* A concentrated urea-formaldehyde resin precursor containing an excess of free formaldehyde and about 15% water, available from Allied Chemical Corporation.

\*\* A styrene-butadiene polymer available from Dow Chemical Corporation; the polymer was added to enhance the impact strength of adhesives into which the hardeners are incorporated.

\*\*\* Calcium carbonate causes evolution of $CO_2$ giving a desirable gap-filling quality to the adhesives.

Table 2

| Adhesive | | pH of Cured Adhesive | Block Shear Tests* — Shear Strength (psi) % Wood Failure | |
|---|---|---|---|---|
| Resin | Hardeners (Table 1) | | Dry | Wet |
| Example 1(a) | I | 4.30 | 1280/55 | 0/0** |
| do. | III | 4.41 | 1760/25 | 0/0** |
| Example 1(b) | I | 4.15 | 1300/95 | 790/85 |
| do. | II | 4.20 | 2020/82 | 320/23 |
| do. | III | 4.35 | 1970/92 | 370/52 |
| Example 1(c) | I | 4.28 | 1550/82 | 650/67 |
| do. | II | 4.35 | 1500/100 | 460/80 |
| do. | III | 4.49 | 1550/90 | 860/43 |

\* Specimens were clamped at 75 p.s.i. for 30 min. at room temperature.

\*\* These specimens delaminated upon wet-conditioning; this is believed to be due to inadequate wetting of the wood by the adhesive. These two adhesives give excellent bonding if the wood is first primed for example with a phenol-formaldehyde resin modified with resorcinol (see U.S. Patent Re. 26,881), diluted with methanol and cured with a 55% formaldehyde solution in methanol and water ("Methyl Formcel" — available from Celanese Corporation) as described in U.S. Pat. application Ser. No. 822,009, filed May 5, 1969.

EXAMPLE 2 a. To a reactor equipped with an agitator, thermometer and means of heating and cooling was added 30.67 parts water and 30.96 parts hydrochloric acid (38%). With agitation, there was then added 35.12 parts m-hydroxy aniline. Mixing was continued until the m-hydroxy aniline was dissolved. A mild exotherm occurred. The reaction mixture was then cooled to 25°C., and then there was added with vigorous agitation 3.25 parts of hydroxyethyl cellulose ("Cellosize QP 40 high"). After the resulting mixture was lump-free, it was heated to 40°C., held there for 30 min., and then cooled to 25°C. The solution had a pH of 2.65 and a Gardner viscosity of "$Z_3Z_4$" at 25°C.

b. A reactor equipped with an agitator, thermometer and means of heating and cooling was charged with 26.08 parts phenol, 12.37 parts water, 26.61 parts formaldehyde (50%) and 2.20 parts methanol. The temperature of the reaction mixture was adjusted to 40°C. and 1.69 parts sodium hydroxide (50%) was added. The temperature of the reaction mixture was raised from 40° to 60°C. in 70 min. at a uniform rate; a mild exotherm occurred above 45°C. The reaction mixture was maintained at 65°C. for 105 min. The pH of the reaction mixture was then adjusted to 8.3 by incremental additions of approximately 0.39 parts formic acid (90%). The reaction mixture was held at 65° for 3 hrs. from the beginning of the pH adjustment period. There was then added 30.66 parts formaldehyde (50%) and after thorough mixing, the reaction mixture was cooled to 25°C.

c. To a reactor equipped with an agitator, thermometer and means of heating and cooling was added 25.94 parts of the resin of Example 2(b). The resin was heated to 60°C., whereupon 34.58 parts resorcinol was added. The resulting mixture was heated from about 40°C. to reflux (104°C.) uniformly in 20 min. An exotherm occurred about 62°C. and became strong above 70°C. Cooling was used to control the up-heat curve. The reaction mixture was refluxed for 5 min. and then cooled to 100°C., whereupon 35.44 parts of the m-HA.HCl-hydroxyethyl cellulose solution of Example 2(a) was added. The reaction mixture was then heated to reflux (105°C.) and maintained there for 2 hrs. The reaction mixture was then cooled to 45°C. and 4.04 parts of pyrogenic silica ("Cab-O-Sil M-5") was added with thorough mixing. The resulting mixture was then cooled to 35°C.

d. Liquid hardener formulations (IV-IX) were prepared by mixing together the ingredients shown in Table 3 in the order recited. One part of each of the hardeners was combined with two parts of the resin of Example 2(c). Films of the resulting adhesives were cast, cured and powdered; the pH values of aqueous slurry of powders of the resulting films were periodically measured as described previously; and the results are recorded in Table 4. The "Pot Lives" of two of the adhesives at temperatures from 50° to 80° are shown in Table 5, as are the Block Shear Test results therefor. Adhesive "Pot Life" was determined by stirring together 20 g. of resin and 10 g. of hardener in a small beaker using a wooden tongue depressor. Stirring was continued until hardening of the resulting adhesive occurred. The "Pot Life" is the elapsed time from initial mixing to hardening.

Table 3

| Ingredients | Hardeners (Parts by Weight) | | | | | |
|---|---|---|---|---|---|---|
| | IV | V | VI | VII | VIII | IX |
| "U.F. 85" | 64.42 | 60.64 | 64.42 | 60.64 | 63.59 | 59.85 |
| Ethanol-formaldehyde Solution (50%)* | 21.21 | | 21.21 | | 20.94 | |
| Water | | 7.59 | | 7.59 | | 7.49 |
| "Dow Latex 612" | | 25.27 | | 25.27 | | 24.95 |
| Calcium Carbonate | 1.00 | 1.00 | 1.00 | 1.00 | 1.00 | 1.00 |

Table 3—Continued

| Ingredients | Hardeners (Parts by Weight) | | | | | |
|---|---|---|---|---|---|---|
| | IV | V | VI | VII | VIII | IX |
| Aluminum Powder | | | 3.50 | 3.50 | | |
| Iron Powder | | | | | 4.74 | 4.74 |
| Walnut Shell Flour | 5.92 | | 5.92 | | 5.83 | |
| "Cab-O-Sil M-5" Pyrogenic Silica | 3.95 | 2.00 | 3.95 | 2.00 | 3.90 | 1.97 |

* Prepared by adding 55.71 parts of paraformaldehyde flakes (91% analysis) to 44.24 parts ethanol and 0.05 parts 50% NaOH with agitation, heating the mixture to reflux (97°C.) and maintaining at reflux for 5 min.

Table 4

| Hardener | pH of Cured Adhesive | | | | | | |
|---|---|---|---|---|---|---|---|
| | 15 min. | 24 hr. | 48 hr. | 72 hr. | 144 hr. | 168 hr. | 192 hr. |
| IV | 1.80 | 1.70 | 1.62 | 1.63 | | | |
| V | 1.70 | 1.65 | 1.61 | 1.63 | | | |
| VI | 1.90 | 2.15 | 2.64 | 2.75 | 3.70 | 3.86 | 3.86 |
| VII | 1.80 | 3.00 | 3.67 | 3.72 | | | |
| VIII | 1.95 | 3.86 | 4.05 | 4.07 | | | |
| IX | 1.95 | 3.80 | 3.95 | 4.02 | | | |

Table 5

| Adhesive | | Pot Life (sec.) | | | | Block Shear Tests - Shear Strength (psi)/ % Wood Failure | |
|---|---|---|---|---|---|---|---|
| Resin | Hardener | 50°F | 60°F | 70°F | 80°F | Dry | Wet |
| Example 2(c) | VI | 96 | 72 | 32 | 28 | 1324/92 | 390/77 |
| do. | VII | 162 | 101 | 54 | 47 | 1695/93 | 440/93 |

EXAMPLE 3 a. A 5-gallon reactor was charged with the following:
17,180.5 g. formaldehyde (49.9%)
1,236.1 g. water
4,173.1 g. acetone The temperature of the reaction mixture was raised to 40°C. and 45.2 g. sodium hydroxide (49.7%) was added with stirring. The solution was then cooled to 30°C. and an additional 45.2 g. sodium hydroxide (49.7%) was added with continued stirring. The temperature of the reaction mixture was then raised to 65°C. in 60 min. at a uniform rate. No heating was required above 36°C.; occasional cooling was applied to control the exotherm. The reaction mixture was maintained at 65°–70°C. for 20 min. and was then cooled to 25°C. The acetone-formaldehyde resin so produced had a free formaldehyde content of 16%.

b. A 4-liter reactor was charged with 890.0 g. methanol and the temperature was adjusted to 30°C. With agitation at 30°C. there was added 1,770.6 g. resorcinol, heating being applied at the start of resorcinol addition. The temperature of the reaction mixture was brought to 60°C. as rapidly as possible. At 60°C. the resorcinol was completely dissolved and there was then added 1,332.4 g. of the acetone-formaldehyde resin of Example 3(a). The temperature of the reaction mixture dropped with the above addition. The mixture was then heated to and maintained at reflux (about 89°C.) for 2 hrs. and was then cooled to 25°C. The resin had a Gardner viscosity of "$A_2A_3$" and a pH of 4.89 at 25°C.

c. A 100 ml. reactor was charged with 95.7 g. of the resorcinol-modified acetone-formaldehyde resin of Example 3(b). The temperature of the resin was adjusted to 25°C. whereupon the resin was thickened by adding with vigorous agitation 2.4 g. of a hydroxyethyl cellulose having a 0.9 to 1.0 degree of substitution, a 1.6 to 2.0 molar substitution of ethylene oxide and a 2% solution LVT Brookfield viscosity of 70 to 110 cps. at 25°C. in the L range ("Cellosize QP 40 (high)" — Union Carbide Corp.). After the hydroxyethyl cellulose was thoroughly wetted, there was added with vigorous agitation 1.9 g. HCl (38%). After thorough mixing, the resin was heated to and maintained at 45°C. for 30 min. and then cooled to 25°C. The resulting resin formulation had a Gardner viscosity of "$Z_5Z_6$" and a pH of 2.5 at 25°C.

d. A hardener formulation (X) was prepared by mixing together the following ingredients in the order recited:

| | |
|---|---|
| "U.F. 85" | 64.23 g. |
| Ethanol-formaldehyde Solution (50%) | 21.15 g. |
| Aluminum Powder | 3.54 g. |
| Walnut Shell Flour | 6.43 g. |
| "Cab-O-Sil M-5" Pyrogenic Silica | 4.65 g. |

The Pot Life of an adhesive prepared from 30 g. of the resin of Example 3(c) and 15 g. of hardener X was 30 seconds. When spread as a thin film the Pot Life of the adhesive increases to 5 to 6 min. Another sample of this adhesive was prepared (2 parts resin and 1 part hardener) and a film thereof was cast, allowed to cure and then powdered. The pH of an aqueous slurry of the power prepared as described previously stabilized upon achieving a value of 4.64. Two parts of the resin of Example 3(c) and one part of hardener X were combined and the resulting adhesive was immediately spread on Douglas fir sheets (6 in. × 8 in. × ¼ in.) and pairs of the sheets were then clamped together at 150 p.s.i. for 3 hrs. to produce 2 billets (6 in. × 8 in. × ½ in.). Each of the billets was then sawed to form six specimens, each being approximately 1 in. × 3-½ in. × ½ in. One set of specimens was dry conditioned and one set was wet conditioned, as described previously, and the specimens were then sheared. Average shear strength (p.s.i.)/% wood failure values for the dry and wet conditioned billets were 575/100 and 487/98, respectively.

Other metals which may be used successfully as substitutes for aluminum and iron in the adhesives of this invention include magnesium, calcium, titanium, vanadium, chromium, manganese and nickel. Because of their low equivalent weights, magnesium and titanium appear particularly attractive as substitutes.

What is claimed is:

1. In a liquid, curable adhesive composition comprising an aldehyde condensation polymer and having a pH of less than 3.5, the improvement wherein said composition further comprises a minor amount of a metal selected from aluminum and iron, said metal being in a finely divided form.

2. The composition of claim 1 wherein the amount of said metal is such that when cured and exposed to hydrolytic condition, said adhesive exhibits a pH of at least 3.5.

3. The composition of claim 1 wherein said liquid composition has a pH of less than 2.5 and wherein the amount of said metal is such that when cured and exposed to hydrolytic conditions, said composition exhibits a pH of at least 3.5.

4. The composition of claim 1 wherein said metal is aluminum.

5. The composition of claim 1 wherein said aldehyde condensation polymer comprises the reaction product of a phenoplast or ketone-aldehyde condensation polymer with an amine salt selected from the hydrochloric, nitric and sulfuric acid salts of m-hydroxy aniline, 2,6-diaminopyridine and 4,4'-diaminodiphenylmethane.

6. The composition of claim 5 wherein said metal is aluminum.

7. The composition of claim 5 wherein said composition further comprises an alkylene donating curing agent.

8. The compositiion of claim 7 wherein said curing agent comprises formaldehyde or a formaldehyde-forming compound.

9. The composition of claim 1 wherein said aldehyde condensation polymer comprises the reaction product of a ketone-aldehyde condensation polymer with a polyhydroxy aromatic compound.

10. The composition of claim 9 wherein said metal is aluminum.

11. The composition of claim 9 wherein said aldehyde condensation polymer comprises the reaction product of an acetone-formaldehyde condensation polymer with resorcinol.

12. The composition of claim 11 wherein said metal is aluminum.

13. The composition of claim 1 wherein said aldehyde condensation polymer comprises an aminoplast.

14. The composition of claim 13 wherein said metal is aluminum.

15. The composition of claim 1 wherein said aldehyde condensation polymer comprises a phenoplast.

16. The composition of claim 15 wherein said metal is aluminum.

17. In a liquid, curable adhesive composition having a pH of less than 3.5 and comprising an aldehyde condensation polymer, said polymer on a weight basis being the principal reactive component in said composition, the improvement comprising a minor amount of a metal selected from aluminum and iron, said metal being in a finely divided form and being present in such an amount that when cured and exposed to hydrolytic conditions, said composition exhibits a pH of at least 3.5.

18. The composition of claim 17 wherein said metal is aluminum.

19. The composition of claim 17 wherein said liquid composition has a pH of less than 2.5.

20. In a liquid, curable adhesive composition having a pH of less than 3.5 and comprising an aldehyde condensation polymer and a curing agent for said polymer, the amounts of said polymer and curing agent being such that reaction therebetween will cause said composition to solidify, the improvement comprising a minor amount of a metal selected from aluminum and iron, said metal being in a finely divided form.

21. The composition of claim 20 wherein the amount of said metal is such that when cured and exposed to hydrolytic conditions, said composition exhibits a pH of at least 3.5.

22. The composition of claim 21 wherein said metal is aluminum.

23. The composition of claim 20 wherein said liquid composition has a pH of less than 2.5 and wherein the amount of said metal is such that when cured and exposed to hydrolytic conditions, said composition exhibits a pH of at least 3.5.

24. The composition of claim 23 wherein said metal is aluminum.

* * * * *